United States Patent [19]

Oyama et al.

[11] Patent Number: 5,032,454

[45] Date of Patent: Jul. 16, 1991

[54] METHOD FOR BONDING RUBBERS TO FIBERS

[75] Inventors: Motofumi Oyama, Yokosuka; Osamu Mori; Nagatoshi Sugi, both of Yokohama, all of Japan

[73] Assignee: Nippon Zeon Co., Ltd., Tokyo, Japan

[21] Appl. No.: 443,826

[22] Filed: Dec. 1, 1989

Related U.S. Application Data

[63] Continuation of Ser. No. 220,968, Jun. 14, 1988, abandoned, which is a continuation of Ser. No. 838,152, Mar. 10, 1986, abandoned.

[30] Foreign Application Priority Data

Mar. 12, 1985 [JP]  Japan ................................ 60-48571

[51] Int. Cl.⁵ .............................................. B32B 9/00
[52] U.S. Cl. ................................... 428/392; 156/137; 156/307.3; 156/330; 156/333; 427/407.1; 428/396; 523/424; 524/501; 524/510; 524/541

[56] References Cited

U.S. PATENT DOCUMENTS

| | | | |
|---|---|---|---|
| 3,240,660 | 3/1966 | Atwell | 428/396 |
| 3,814,713 | 6/1974 | Honda et al. | 524/510 |
| 3,855,168 | 12/1974 | Ozeki et al. | 524/510 |
| 4,048,362 | 9/1977 | Moring et al. | 156/333 |
| 4,251,409 | 2/1981 | Neubert | 260/29.3 |
| 4,404,329 | 9/1983 | Maeda et al. | 525/352 |

OTHER PUBLICATIONS

"The Elastomers Manual", International Institute of Synthetic Rubber Producers, Inc., New York, N.Y., 1974 edition.

Primary Examiner—John J. Gallagher
Attorney, Agent, or Firm—Sherman and Shalloway

[57] ABSTRACT

In a method for bonding a nitrile group-containing highly saturated polymer rubber having an iodine value of 120 or less to fibers on vulcanization, the improvement wherein fibers treated with an aqueous dispersion comprising a halogen-containing polymer latex and a resorcinol-formaldehyde resin are used.

12 Claims, No Drawings

METHOD FOR BONDING RUBBERS TO FIBERS

This application is a continuation of application Ser. No. 07/220,968, filed June 14, 1988, which in turn is a continuation of application Ser. No. 06/838,152, filed Mar. 10, 1986, both now abandoned.

This invention relates to a method for bonding a nitrile group-containing highly saturated polymer rubber to fibers on vulcanization, and to a composite material wherein a rubber is firmly bonded to fibers.

A great many rubber products have been so far composites of rubbers and fibers. In order to satisfy performance of these products, it is important to adhere rubbers to fibers. A method has been hitherto employed wherein rubbers are bonded to fibers treated with a mixed solution of a resorcinol-formaldehyde resin and a latex (hereinafter sometimes called "RFL").

In recent years, as the temperature around engines increases to meet an exhaust gas control of an automobile, a conventional oil resistant acrylonitrile-butadiene copolymer rubber (NBR) is insufficient in heat resistance, and nitrile group-containing highly saturated polymer rubbers having an oil resistance as well as a heat resistance have been therefore developed. Production of composite products comprising the nitrile group-containing highly saturated polymer rubbers and fibers, such as timing belts, conveyor belts, hoses, diaphragms, and so forth have been studied to make use of the properties of the nitrile group-containing highly saturated polymer rubbers.

Since the nitrile group-containing highly saturated polymer rubbers however contain a small amount of a double bond, a sufficient bonding strength cannot be obtained even if conducting bonding on vulcanization with the use of fibers treated with RFL which is obtained from a NBR latex commonly used in bonding NBR to fibers on vulcanization. To remedy this drawback, a method has been attempted wherein bonding is performed on vulcanization using fibers treated with RFL which is formed from a carboxyl group containing NBR latex (Japanese Patent Publication No. 24131/85).

Nevertheless, a bonding strength between the nitrile group-containing highly saturated rubber and the fibers in accordance with this method is still insufficient, and further a bonding strength in an atmosphere of high temperatures in which to use such composite is insufficient too.

An object of this invention is to provide a method for bonding a nitrile group-containing highly saturated polymer rubber to fibers, said method being free from the above drawbacks. Another object of this invention is to provide a composite material comprising the rubber and the fibers, both being firmly bonded to each other.

Such objects of this invention can be achieved by a method for bonding a nitrile group-containing highly saturated polymer rubber having an iodine value of 120 or less to fibers on vulcanization characterized by using fibers treated with an aqueous dispersion comprising a halogen-containing polymer latex and a resorcinol-formaldehyde resin, and by a composite material wherein a vulcanized rubber is firmly bonded to fibers characterized in that the vulcanized rubber is a vulcanizate of a nitrile group-containing highly saturated polymer rubber having an iodine value of 120 or less, and the fibers are those treated with an aqueous dispersion comprising a halogen-containing polymer latex and a resorcinol-formaldehyde resin.

In the nitrile group-containing highly saturated polymer rubber used in this invention, the content of the nitrile group-containing monomer unit in said rubber is, from the aspect of oil resistance, usually 5 to 50% by weight and can be properly selected within the above range depending on usage (solvents or oils contacting with said rubber). The iodine value of the nitrile group-containing highly saturated polymer rubber is 120 or less from the aspect of heat resistance. Where the iodine value exceeds 120, the heat resistance lowers. It is preferably 0 to 100, more preferably 0 to 85.

Examples of the nitrile group-containing highly saturated polymer rubber in this invention include a rubber obtained by hydrogenating a conjugated diene unit portion of an unsaturated nitrile-conjugated diene copolymer rubber, a terpolymer rubber of unsaturated nitrile-conjugated diene-ethylenically unsaturated monomer, a rubber obtained by hydrogenating a conjugated diene unit portion of the terpolymer rubber and a copolymer rubber of unsaturated nitrile-ethylenically unsaturated monomer. These nitrile group-containing highly saturated polymer rubbers are formed by a common polymerization method and a common hydrogenation method. Needless to say, a method for producing the rubbers is not limited in particular in this invention.

Monomers employed to produce the nitrile group-containing highly saturated polymer rubber in this invention are illustrated below.

Examples of the unsaturated nitrile are acrylonitrile and methacrylonitrile. Examples of the conjugated diene are 1,3-butadiene, 2,3-dimethylbutadiene, isoprene and 1,3-pentadiene. Examples of the ethylenically unsaturated monomer are unsaturated carboxylic acids such as acrylic acid, methacrylic acid, itaconic acid and maleic acid, and salts thereof; esters of said carboxylic acids such as methyl acrylate and 2-ethylhexyl acrylate; alkoxyalkyl esters of said unsaturated carboxylic acids such as methoxymethyl acrylate, ethoxyethyl acrylate and methoxyethyl acrylate; acrylamide, methacrylamide; and N-substituted (meth)acrylamides such as N-methylol (meth)acrylamide, N,N'-dimethylol (meth)acrylamide and N-ethoxymethyl (meth)acrylamide.

The copolymer rubber of unsaturated nitrileethylenically unsaturated monomer may be one obtained by replacing part of the unsaturated monomer with a nonconjugated diene such as vinyl norbornene, dicyclopentadiene or 1,4-hexadiene.

Examples of the nitrile group-containing highly saturated polymer rubber used in this invention are hydrogenated products of a butadiene-acrylonitrile copolymer rubber, an isoprene-butadiene-acrylonitrile copolymer rubber and an isoprene-acrylonitrile copolymer rubber; a butadiene-methyl acrylate-acrylonitrile copolymer rubber, butadiene-acrylic acid-acrylonitrile copolymer rubber, hydrogenated products of these rubbers; a butadiene-ethylene-acrylonitrile copolymer rubber; a butyl acrylate-ethoxyethyl acrylate-vinyl chloroacetate-acrylonitrile copolymer rubber; and a butyl acrylate-ethoxyethyl acrylate-vinyl norbornene-acrylonitrile copolymer rubber.

By the way, the iodine value of each component polymer in this invention is found according to JIS K 0070.

Examples of the fibers used in this invention are natural fibers such as cotton fibers; regenerated fibers such as rayons; polyamide fibers including aliphatic polyamides such as nylon 6 and nylon 66 disclosed in U.S. Pat. No. 4,251,409 and aromatic polyamides such as Kevlar (tradename for a product made by E. I. du Pont de Nemours & Co.); linear polyester fibers such as polyethylene terephthalate disclosed in said U.S. Patent; polyvinylalcohol fibers; steel fibers; glass fibers; and carbon fibers. These fibers may be used singly or in combination. The fibers are embedded in the rubber of this invention as a reinforcing material in the form of staple fibers, filaments, cords, ropes and woven fabrics. The type and the shape of the fibers can be properly determined depending on usage and are not limited in particular.

In this invention, any halogen-containing polymer latexes will do. The halogen content in the polymer is preferably at least 1% by weight. When the halogen content is less than 1% by weight, a sufficient bonding strength is hardly obtainable at room temperature and high temperatures. It is more preferably at least 5% by weight, and most preferably 10% by weight. Where the halogen content reaches at least 45% by weight, a bonding strength is saturated. From the standpoint of a cold resistance, a glass transition temperature of the polymer is preferably 0° C. or below.

Preferable examples of the halogen-containing polymer latex are a latex of an epichlorohydrin polymer; a latex of a copolymer of epichlorohydrin and one or more other epoxides or oxetane; a latex of chloroprene rubber; a latex of chlorosulfonated polyethylene; a latex of chlorinated polyethylene, latexes of halogen-containing acrylic rubbers obtained by copolymerizing halogen-containing monomers at crosslinking sites, such as vinyl chloroacetate, vinyl bromoacetate, allyl chloroacetate, 2-chloroethyl acrylate, 2-chloroethylvinyl ether and vinylbenzyl chloride; latexes of chlorinated or brominated products of diene rubbers such as an acrylonitrile-butadiene copolymer rubber, a styrene-butadiene copolymer rubber and a polybutadiene rubber; latexes of brominated butyl rubbers; a latex of polyvinylidene chloride; and a latex of a chlorinated or brominated product of EPDM. These halogen-containing polymer latexes may be used singly or in comqination.

The halogen-containing polymer latexes produced by emulsion polymerization can be used as such. Commercially available solid polymers are formed into latexes by a usual phase inversion method. A method for producing latexes is not limited in particular in this invention.

The treating dip of the fibers is an aqueous dispersion comprising the aforesaid halogen-containing polymer latex and the resorcinol-formaldehyde resin. The ratio of said components of the treating dip is not limited particularly. The latex to resorcinol-formaldehyde resin weight ratio (as a solids content) is preferably in the range of 10:1 to 2:1. The resorcinol to formaldehyde molar ratio in the resorcinol-formaldehyde resin is not either limited in particular. Usually, the ratio is preferably 1:3 to 3:1, and more preferably 1:1 to 1.5:1.

The resorcinol-formaldehyde resin mixed aqueous solution in this invention can be a mixed aqueous solution disclosed in U.S. Pat. No. 4,251,409 which is commonly used for bonding rubbers to fibers on vulcanization. Said aqueous solution is thus not limited particularly. The concentration of the treating dip is not limited in particular, either. The above components are contained in an amount of 10 to 30% by weight (as a solids content).

A method for treating fibers with a RFL treating dip formed from a halogen-containing polymer latex is not limited in particular. Generally, the fibers are immersed according to an immersing method and then heat-treated.

In this invention, the heat-treating conditions are not limited in particular, and are somewhat varied depending on types of the fibers. Temperatures and time are those sufficient to react and fix RFL adhered by immersion and usually 140° to 210° C. and a few minutes.

By the way, some types of fibers may be previously dipped in an isocyanate solution, an epoxy solution or a mixture of these prior to immersing them in the treating dip, and then dried. On this occasion, the drying temperature is preferably below the subsequent heat-treating temperature.

When the nitrile group-containing highly saturated polymer rubber compound is bonded to the above treated fibers on vulcanization, said fibers are embedded in the rubber compound by mixing or laminating them with the rubber compound, followed by vulcanization under the usual vulcanization conditions of the rubber compound.

In this manner, the composite material comprising the nitrile group-containing saturated polymer rubber and the fibers is obtained wherein both are firmly bonded to each other.

The nitrile group-containing highly saturated polymer rubber compound is formed by mixing the rubber with compounding ingredients ordinarily used in the rubber industry through an ordinary mixer. Types and amounts of ingredients are determined according to use purpose of the rubber-fiber composite, and not limited particularly in this invention. Commonly used examples of the compounding ingredients are sulfur vulcanization systems comprising sulfur donor compounds (e.g. sulfur and tetramethylthiuram disulfide), zinc oxide, stearic acid, various vulcanization accelerators (e.g. guanidine-type, thiazole-type, thiuram-type and dithiocarbamate-type); organic peroxide vulcanization systems such as dicumyl peroxide, 2,5-dimethyl-2,5-di(t-butylperoxy)-hexine-3, bis(t-butylperoxyisopropyl)-benzene and 2,5-dimethyl-2,5-di(t-butylperoxy)-hexane; reinforcing agents or fillers such as carbon blacks of various grades (e.g. HAF and FEA,, silica, talc and calcium carbonate; and other additives such as plasticizers, process oils, processing aids and antioxidants.

This invention can produce composite materials having excellent oil resistance and heat resistance wherein the nitrile group-containing highly saturated polymer rubber is firmly bonded to the fibers on vulcanization. Consequently, the method of this invention can profitably be applied to production of transmission belts (e.g. timing belts) and conveyor belts.

The following Examples illustrate this invention in more detail.

EXAMPLE 1

A glass fiber cord (ECG 150 3/10 2.0 S) was immersed in a 5% aqueous dispersion of α-aminopropyltriethoxysilane, and then heat-treated at 150° C. for 3 minutes and again at 200° C. for 1 minute.

The thus treated glass fiber cord was immersed in a treating dip indicated in Table 1, and then reacted at 200° C. for 2 minutes. The treated cord was interposed between two sheets of a rubber compound obtained by mixing Zetpol 2020 (tradename for a product made by Nippon Zeon Co., Ltd.; NBR having an iodine value of 28 and containing 37% by weight of bound acrylonitrile) with compounding ingredients indicated in Table 2 on a roll to prepare test samples for cord pulling test (H test according to ASTM D 2138-72). The test samples were vulcanized at 160° C. for 20 minutes. The results of H test are indicated in Table 3.

TABLE 1

|  | This invention |  |  |  |  |  | Comparative Example |  |  |
|---|---|---|---|---|---|---|---|---|---|
|  | A | B | C | D | E | F | G | H | I |
| Resorcinol | 5.0 | 5.0 | 5.0 | 5.0 | 5.0 | 5.0 | 5.0 | 5.0 | 5.0 |
| Formaldehyde | 3.1 | 3.1 | 3.1 | 3.1 | 3.1 | 3.1 | 3.1 | 3.1 | 3.1 |
| LV-60 (*1) | 61.1 | | | | | | | | |
| CSM latex 450 (*2) | | 61.6 | | | | | | | |
| CHR phase inversion latex (*3) | | | 61.6 | | | | | | |
| CHC phase inversion lates (*4) | | | | 61.6 | | | | | |
| Acrylic rubber latex E (*5) | | | | | 61.6 | | | | |
| Acrylic rubber latex F (*6) | | | | | | 61.6 | | | |
| Nipol 1551 (*7) | | | | | | | 41.0 | | |
| Nipol 1571 (*8) | | | | | | | | 61.6 | |
| Nipol 2518 FB (*9) | | | | | | | | | 41.0 |
| Water | 84.3 | 84.3 | 84.3 | 84.3 | 84.3 | 84.3 | 104.9 | 84.3 | 104.9 |
| Total | 154.0 | 154.0 | 154.0 | 154.0 | 154.0 | 154.0 | 154.0 | 154.0 | 154.0 |

Notes:
(*1) Chloroprene rubber latex (chlorine content 41% by weight) - product made by Denki Kagaku Kogyo K.K.
(*2) Chlorosulfonated polyethylene latex (chlorine content 25% by weight) - product made by Seitetsu Kagaku Co., Ltd.
(*3) Product obtained by forming into a latex Hydrin 100 (tradename for an epichlorohydrin polymer rubber made by B. F. Goodrich Chem.) through phase inversion (chlorine content 38% by weight)
(*4) Product obtained by forming into a latex Hydrin 200 (tradename for an epichlorohydrin copolymer rubber made by B. F. Goodrich Chem.) through phase inversion (chlorine content 26% by weight)
(*5) Ethyl acrylate/2-chloroethylvinyl ether (90/10 molar ratio) copolymer rubber latex (chlorine content 3.6% by weight)
(*6) Ethyl acrylate/2-chloroethylvinyl ether (95/5 molar ratio) copolymer rubber latex (chlorine content 1.8% by weight)
(*7) NBR latex made by Nippon Zeon Co., Ltd.
(*8) Carboxy-modified NBR latex made by Nippon Zeon Co., Ltd.
(*9) SBR latex made by Nippon Zeon Co., Ltd.

TABLE 2

| Recipe | Parts by weight |
|---|---|
| Zetpol 2020 | 100 |
| Zinc oxide #1 | 5 |
| Stearic acid | 1 |
| Sulfur | 0.5 |
| SRF carbon black | 40 |
| Tetramethylthiuram disulfide | 2 |
| Mercaptobenzothiazole | 0.5 |

TABLE 3

| | | Pulling strength (kg/cm) |  |  |  |  |  |  |  |  |
|---|---|---|---|---|---|---|---|---|---|---|
| | | Latex |  |  |  |  |  |  |  |  |
| | | This invention |  |  |  |  |  | Comparative Example |  |  |
| Rubber | | A | B | C | D | E | F | G | H | I |
| Zetpol 2020 (*10) | at 120° C. | 22.5 | 29.7 | 28.6 | 22.3 | 18.6 | 19.7 | 14.6 | 15.6 | 13.4 |
| | at room temp. | 24.3 | 31.5 | 30.9 | 23.5 | 22.4 | 20.3 | 22.4 | 18.2 | 15.7 |

Note)
(*10) Tradename for NBR made by Nippon Zeon Co., Ltd. (amount of bound nitrile 37% by weight, iodine value 28)

EXAMPLE 2

The procedure in Example 1 was repeated using the treating dips (B, C, G and H) in Example 1 and fiber cords indicated in Table 4 instead of the glass fiber cords. The results of H test are shown in Table 4.

TABLE 4

| | | | Pulling strength (kg/cm) |  |  |
|---|---|---|---|---|---|
| | | | Type of cord |  |  |
| Treating solution | | | Nylon 6 (1260 D/3 × 3) | Aromatic polyamide* (1500 D/1 × 4) | Polyester** (1500 D/3 × 3) |
| This invention | B | at 120° C. | 25.1 | 23.1 | 25.3 |
| | | at room temp. | 30.8 | 28.4 | 32.4 |
| | C | at 120° C. | 23.5 | 20.8 | 24.6 |
| | | at room temp. | 29.6 | 27.6 | 31.5 |
| Com- | G | at | 14.6 | 12.5 | 18.1 |

TABLE 4-continued

| Treating solution | | Pulling strength (kg/cm) | | |
|---|---|---|---|---|
| | | Type of cord | | |
| | | Nylon 6 (1260 D/3 × 3) | Aromatic polyamide* (1500 D/1 × 4) | Polyester** (1500 D/3 × 3) |
| parative Example | 120° C. at room temp. | 23.5 | 21.5 | 22.5 |
| H | at 120° C. | 17.4 | 14.9 | 13.9 |
| | at room temp. | 26.4 | 19.6 | 24.5 |

*Kevlar: Tradename for a product made by E. I. du Pont de Nemours & Co.
**Polyethylene terephthalate

EXAMPLE 3

An acrylonitrile-butadiene copolymer rubber (hereinafter abbreviated as "NBR") containing 40% by weight of bound acrylonitrile and having an iodine value of 295 was dissolved in methyl isopropyl ketone. Butadiene in NBR was partially hydrogenated in a pressure vessel using Pd-carbon as a catalyst. Three types of partially hydrogenated NBR's having iodine values of 150, 104 and 51 respectively were thus formed.

Moreover, a butadiene/butyl acrylate/acrylonitrile (61/5/34% by weight) terpolymer (hereinafter abbreviated as "NBBR-I") having an iodine value of 235 was produced by usual emulsion polymerization. The terpolymer was partially hydrogenated to adjust the iodine value to 65 (hereinafter abbreviated as "NBBR-II").

To each of the above five polymers were added a variety of compounding ingredients according to the recipe indicated in Table 2 and they were mixed to form a rubber compound sheet. The pulling strength was measured in the same way as in Example 1. The results are shown in Table 5.

What we claim is:

1. In a method for bonding a nitrile group-containing highly saturated polymer rubber having an iodine value of 120 or less to fibers on vulcanization, the improvement wherein the fibers are treated with an aqueous dispersion consisting essentially of chlorosulfonated polyethylene latex and a resorcinol-formaldehyde resin obtained by reacting resorcinol with formaldehyde in a molar ratio of resorcinol to formaldehyde within the range of from 1:3 to 3:1 in the presence of an alkaline catalyst, contacting the treated fibers with the nitrile group-containing highly saturated polymer rubber and vulcanizing the rubber.

2. The method of claim 1 wherein the highly saturated polymer rubber is at least one rubber selected from the group consisting of a rubber obtained by hydrogenating a conjugated diene unit portion of an unsaturated nitrile-conjugated diene copolymer rubber, a terpolymer rubber of an unsaturated nitrile-conjugated diene-ethylenically unsaturated monomer, a rubber obtained by hydrogenating a conjugated diene unit portion of the terpolymer rubber, and a copolymer rubber of an unsaturated nitrile-ethylenically unsaturated monomer.

TABLE 5

| Polymer | | Pulling strength (kg/cm) | | | | | | | | |
|---|---|---|---|---|---|---|---|---|---|---|
| | | Latex | | | | | | | | |
| | | This invention | | | Comparative Example | | | | | |
| | | A | B | C | A | B | C | H | I | J |
| Partially hydrogenated NBR (iodine value 104) | at 120° C. | 21.5 | 24.6 | 24.5 | — | — | — | 13.4 | 14.1 | 13.3 |
| | at room temp. | 29.8 | 28.3 | 30.6 | — | — | — | 25.3 | 27.5 | 24.1 |
| Partially hydrogenated NBR (iodine value 51) | at 120° C. | 23.4 | 28.7 | 29.4 | — | — | — | 15.4 | 16.1 | 12.4 |
| | at room temp. | 29.5 | 32.6 | 31.5 | — | — | — | 20.5 | 24.3 | 19.8 |
| NBBR-II (iodine value 65) | at 120° C. | 24.4 | 27.5 | 27.7 | — | — | — | 15.9 | 16.5 | 13.4 |
| | at room temp. | 28.5 | 31.5 | 30.5 | — | — | — | 22.4 | 26.5 | 21.7 |
| Partially hydrogenated NBR (iodine value 150) | at 120° C. | — | — | — | 18.7 | 17.5 | 14.5 | — | — | — |
| | at room temp. | — | — | — | 26.3 | 25.5 | 22.6 | — | — | — |
| NBBR-I (iodine value 235) | at 120° C. | — | — | — | 13.2 | 14.6 | 13.8 | — | — | — |
| | at room temp. | — | — | — | 28.4 | 25.8 | 26.4 | — | — | — | omer.

3. The method of claim 1 wherein the halogen-containing polymer latex is such that the halogen content in the polymer is at least 1% by weight.

4. The method of claim 1 wherein the aqueous dispersion of the halogen-containing polymer latex and resorcinol-formaldehyde has a solids content in the range of from 10 to 30% by weight.

5. The method of claim 1 wherein the fibers are treated with an aqueous dispersion containing the halogen-containing polymer latex and the resorcinol-formaldehyde resin at a weight ratio of from 10:1 to 2:1.

6. The method of claim 1 wherein the fibers are treated with the aqueous dispersion at a temperature of from 140° to 210° C.

7. In a composite material wherein a vulcanized rubber is firmly bonded to fibers, the improvement wherein the vulcanized rubber is a vulcanizate of a nitrile group-containing highly saturated polymer rubber having an iodine value of 120 or less, and the fibers are those treated with an aqueous dispersion consisting essentially of chlorosulfonated polyethylene latex and a resorcinol-formaldehyde resin obtained by reacting resorcinol with formaldehyde in a molar ratio of resorcinol to formaldehyde within the range of from 1:3 to 3:1 in the presence of an alkaline catalyst, the treated fibers being contacted with the rubber prior to vulcanization thereof.

8. The composite material of claim 4 wherein the content of the nitrile group-containing monomer unit in the nitrile group-containing highly saturated polymer rubber is from 5 to 50% by weight.

9. The composite material of claim 7 wherein the nitrile group-containing highly saturated polymer rubber has an iodine value of from 0 to 85.

10. The composite material of claim 7 wherein the highly saturated polymer rubber is at least one rubber selected from the group consisting of a rubber obtained by hydrogenating a conjugated diene unit portion of an unsaturated nitrile-conjugated diene copolymer rubber, a terpolymer rubber of an unsaturated nitrile-conjugated diene-ethylenically unsaturated monomer, a rubber obtained by hydrogenating a conjugated diene unit portion of the terpolymer rubber, and a copolymer rubber of an unsaturated nitrile-ethylenically unsaturated monomer.

11. The composite material of claim 4 wherein the highly saturated polymer rubber is selected from the group consisting of hydrogenated butadiene-acrylonitrile copolymer rubber, hydrogenated isoprene-butadiene-acrylonitrile copolymer rubber, hydrogenated isoprene-acrylonitrile copolymer rubber, butadiene-methylacrylate-acrylonitrile copolymer rubber, butadiene-acrylic acid-acrylonitrile copolymer rubber, hydrogenated butadiene-methylacrylate-acrylonitrile copolymer rubber, hydrogenated butadiene-acrylic acid-acrylonitrile copolymer rubber, butadiene-ethylene-acrylonitrile copolymer rubber, butylacrylate-ethoxyethylacrylate-vinyl chloroacetate-acrylonitrile copolymer rubber and butylacrylate-ethoxyethylacrylate-vinyl norborneneacrylonitrile copolymer rubber.

12. The composite material of claim 7 wherein the fiber material is selected from the group consisting of cotton fibers, rayon fibers, aliphatic polyamide fibers, aromatic polyamide fibers, linear polyester fibers, polyvinyl alcohol fibers, steel fibers, glass fibers, carbon fibers and mixtures thereof.

* * * * *